Oct. 20, 1959 A. I. CHAMBERS 2,909,636
ELECTRIC HEATING ELEMENT
Filed March 27, 1957
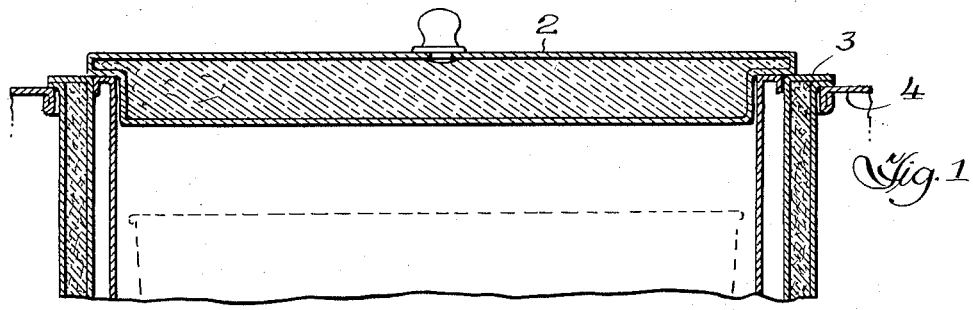
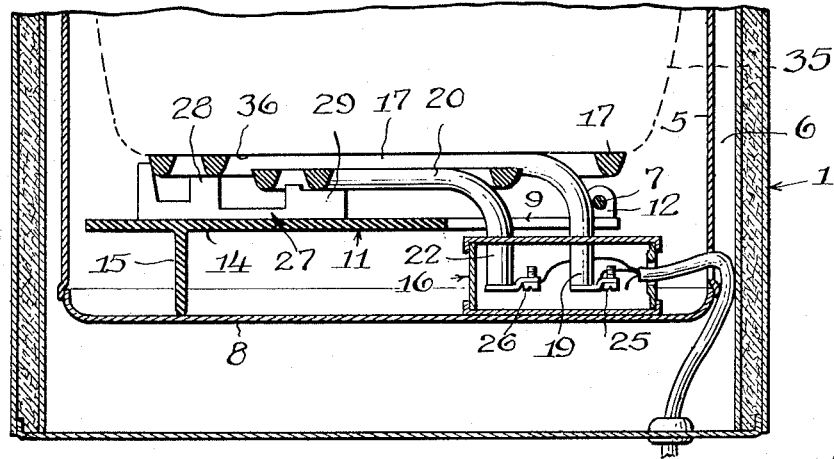
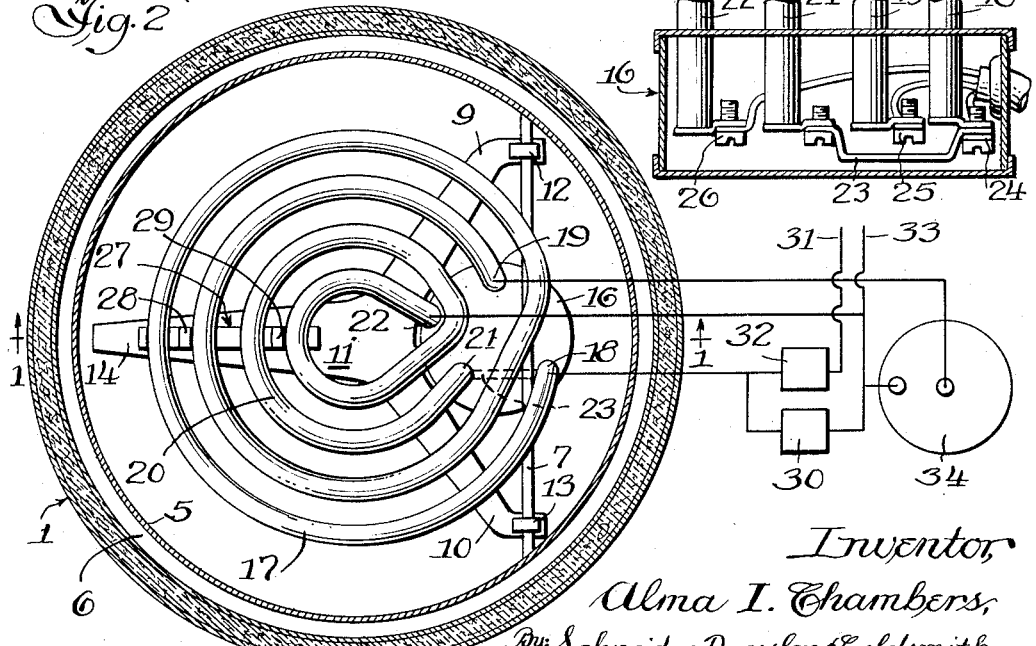
Inventor,
Alma I. Chambers,
By Schneider, Dressler & Goldsmith,
Attys.

United States Patent Office 2,909,636
Patented Oct. 20, 1959

2,909,636

ELECTRIC HEATING ELEMENT

Alma I. Chambers, Shelbyville, Ind., assignor to Chambers Corporation, a corporation of Indiana Application March 27, 1957, Serial No. 648,819

3 Claims. (Cl. 219—37)

This invention relates to an electric heating element comprising two heating coils for cooking food without close personal attention and without danger of scorching the food.

The heating element of the present invention is particularly designed for use in an insulated container but its use is not limited to such environment. In use, a utensil containing food is placed on the heating element which has a high heat coil and a low heat coil. The food is heated rapidly to the desired cooking temperature by the use of the high heat coil, and when the desired temperature is attained the high heat coil is automatically shut off. The low heat coil continues to supply a small amount of heat to the utensil. The low heat, together with the heat retained in the container is sufficient to continue the cooking until the food is completely cooked. The use of a low heat coil for the major portion of the cooking period effects a considerable saving in electricity.

When the food is completely cooked it is not necessary to shut off the second or low heat coil immediately. The low heat coil is spaced below the first or high heat coil, upon which the cooking utensil rests, to provide an air space between the low heat coil and the bottom of the utensil. This air space prevents scorching the food being cooked even when the low heat coil is left on for several hours. The low heat coil is preferably concentric with the high heat coil, but may be positioned in any desirable position as long as its top surface is spaced at a lower level than the top surface of the high heat coil.

The high heat coil is preferably turned off automatically after a predetermined time interval by a timer switch, but it may be controlled by a manually operated switch, if desired. Manual operation of the switch is not as efficient as the automatic operation of a timer switch, but it does permit food to be cooked for a long period of time without danger of being scorched.

The electric circuit includes a small glow lamp which glows as long as any current is passing, to provide visual evidence as to whether the heating element is in operation. Both heat coils are supported by a spider pivotally mounted in the bottom of the container. The spider and heating element may be swung upwardly to facilitate cleaning the interior of the container.

The structure by means of which the above and other advantages are attained will be described in detail in the following specification, taken in conjunction with the accompanying drawing, showing a preferred illustrative embodiment of the invention, in which:

Figure 1 is a vertical sectional view, taken along line 1—1 of Fig. 2, through a cooking container having a heating element embodying the invention positioned in the bottom of the container;

Fig. 2 is a horizontal sectional view through the container, showing the heating element in top elevation and showing the wiring diagrammatically; and Fig. 3 is an enlarged cross sectional view through the terminal box showing the ends of both heat coils in elevation.

In the drawing, the reference numeral 1 indicates an insulated container having an insulated cover 2 and a lateral flange 3 for supporting the container in a suitable opening in a stove top, cabinet or counter top indicated at 4. The specific structure of the container is not important insofar as the present invention is concerned, but it will be understood that the container is provided with sufficient insulation and circulation of air to keep its outside cool and to permit it to maintain the desired temperature in the food with a very small continuous source of heat.

The container 1 has an inner shell 5 supported in any suitable manner and spaced from the inner wall of the container to provide an air space 6 therebetween. A shaft 7 mounted in the shell 5 in spaced relationship to its bottom 8 provides a pivotal support for two legs 9 and 10 of a spider 11. Each of the legs 9 and 10 has an upstanding lug 12 and 13, respectively, apertured to receive the shaft 7. The spider 11 has a third leg 14 provided with a depending flange 15 adapted to rest on the bottom wall 8 to support the spider in a horizontal plane.

A terminal box 16 positioned on the bottom wall 8 fits between the legs 9 and 10 of the spider. The height of the terminal box is preferably less than the distance between the bottom wall 8 of shell 5 and the bottom surface of spider 11 so that the spider may have any desirable shape. The terminal box is free to move when the spider and the heat coils are moved pivotally on the shaft 7. A heat coil 17 disposed in a horizontal plane above the spider has its opposite ends 18 and 19 extending downwardly through the top of the terminal box 16. A heat coil 20 is also disposed in a horizontal plane above the spider 11, but below the plane of the top surface of coil 17.

The coils 17 and 20 are preferably concentric spiraloids, but may be of any desired configuration and need not be concentric. The opposite ends 21 and 22 of coil 20 extend downwardly through the top of the terminal box 16. The end 18 of coil 17 and the end 21 of coil 20 are connected in parallel, as indicated at 23, to a terminal 24. The end 19 of coil 17 is connected to a terminal 25, and the end 22 of coil 20 is connected to a terminal 26. The portions of both coils remote from the terminal box 16 are supported by a block 27 mounted on the top of leg 14 of the spider 11 and having steps 28 and 29 of different heights. The coil 20 rests on the step 29 the upper surface of which is about one-fourth of an inch below the upper surface of step 28.

The wiring circuit comprises three parallel branches, one for the heating coil 17, one for the heating coil 20, and one for a glow lamp 30. The heating coil 17 is for high heat and operates at 115 volts with an input of about 1400 watts. The heating coil 20 is for low heat and operates at 115 volts with an input of about 75 watts. One lead 31 connected to the terminal 24 has a switch 32 in series therewith. The switch 32 is preferably a manually operable toggle switch, and controls the entire electrical input of the circuit. The other lead 33 is connected directly to the terminal 26 so that the heat coil 20 will be energized whenever the switch 32 is closed. The glow lamp 30 is connected directly across both leads 31 and 33 between switch 32 and terminal 23 and will glow whenever switch 32 is closed, thereby indicating that current is flowing through at least one branch of the circuit. The lead 33 is also connected to the terminal 25, but this branch has a time switch 34 in series therein. Accordingly, the coil 17 is energized only when both switches 32 and 34 are closed. When the switch 34 is open the branch including the coil 17 is de-energized, but the rest of the circuit is not.

The operation of the heating element is very simple. When a utensil 35 containing the food to be cooked is placed on the heating element, the bottom 36 of the utensil rests on heat coil 17, and the heat coil 20 is spaced below it about one-fourth of an inch. The cover 2 is placed on the container and the switch 32 is closed. The switch 34 is then closed and set to remain closed for a predetermined period of time. The time for which the switch 34 is set is the number of minutes required to bring the food within the container to the proper cooking temperature. The high heat coil 17 heats the food up to the proper cooking temperature rapidly, and the desired temperature is reached a short time before the expiration of the time setting for the switch 34. The switch 34 is opened automatically, but the low heat coil 20 remains energized and sufficient heat is maintained within the insulated container to continue the cooking process indefinitely.

The temperature of the low heat coil 20 is much higher than the proper cooking temperature, regardless of how small the input in this coil may be, and scorching would occur if the bottom of the utensil remained in contact with the heated coil for a protracted period of time. The spacing of the low heat coil 20 from the bottom 36 of the utensil 35 to avoid actual contact prevents the possibility of scorching the food being cooked.

While I have described a preferred embodiment of my invention in considerable detail, it will be understood that the description is intended to be illustrative, rather than restrictive, as many details may be modified or changed without departing from the spirit or scope of my invention. Accordingly, I do not desire to be restricted to the exact details of construction described.

I claim:

1. A heating element comprising a high heat coil and a low heat coil connected in parallel branches of an electrical circuit, the upper surface of said low heat coil being spaced below the upper surface of said high heat coil to maintain an air space between said low heat coil and any cooking utensil disposed on said heating element to prevent scorching of the contents of a cooking utensil when heated by only said low heat coil, the branch of said high heat coil including a timer switch in series with said high heat coil to deenergize the same automatically after a predetermined time and leave said low heat coil energized to continue to supply heat to a cooking utensil supported on said heating element.

2. An apparatus for cooking food comprising an insulated container, a heating element in said container, said heating element comprising a pair of concentric heat coils disposed at slightly different levels, the upper heat coil being adapted to support a cooking utensil in spaced relationship to the lower heat coil to provide an air space between said lower heat coil and the bottom of the cooking utensil, said upper heat coil affording a high heat to heat the contents of said cooking utensil to a predetermined cooking temperature rapidly, and a timer switch to shut off said upper heat coil automatically, said lower heat coil being adapted to supply a low heat to said cooking utensil to maintain the contents of said utensil at said cooking temperature indefinitely without scorching said contents.

3. In apparatus for cooking food and provided with electric heating means including a high heat coil and a low heat coil, the combination with said high heat coil and said low heat coil of a support structure for supporting a cooking utensil with said high heat coil in engagement with the bottom of said utensil to bring the contents of said utensil to cooking temperature quickly when said high heat coil is energized, said low heat coil being maintained at a temperature above the cooking temperature of said contents when it is energized, said low heat coil being spaced from the bottom of said utensil by an air space to prevent scorching of the contents of said utensil by heat from low heat coil, and means to deenergize said high heat coil and to energize said low heat coil after a predetermined time lapse from the initial energization of said high heat coil.

References Cited in the file of this patent

UNITED STATES PATENTS

| | | |
|---|---|---|
| 2,180,602 | Morgan | Nov. 21, 1939 |
| 2,440,128 | Sullivan | Apr. 20, 1948 |
| 2,485,990 | Snow | Oct. 25, 1949 |
| 2,692,937 | Clark | Oct. 26, 1954 |
| 2,723,335 | Hotchkin | Nov. 8, 1955 |
| 2,727,129 | Davis | Dec. 13, 1955 |